US011751147B2

(12) United States Patent
Ly et al.

(10) Patent No.: US 11,751,147 B2
(45) Date of Patent: Sep. 5, 2023

(54) TECHNIQUES AND APPARATUSES FOR SYNCHRONIZATION SIGNAL SCANNING BASED AT LEAST IN PART ON A SYNCHRONIZATION RASTER

(71) Applicant: QUALCOMM Incorporated, San Diego, CA (US)

(72) Inventors: Hung Dinh Ly, San Diego, CA (US); Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/123,784

(22) Filed: Sep. 6, 2018

(65) Prior Publication Data

US 2019/0082402 A1 Mar. 14, 2019

Related U.S. Application Data

(60) Provisional application No. 62/556,077, filed on Sep. 8, 2017.

(51) Int. Cl.
*H04W 56/00* (2009.01)
*H04J 11/00* (2006.01)
*H04B 7/26* (2006.01)

(52) U.S. Cl.
CPC ....... *H04W 56/001* (2013.01); *H04J 11/0073* (2013.01); *H04J 11/0076* (2013.01); *H04W 56/0025* (2013.01); *H04B 7/2656* (2013.01)

(58) Field of Classification Search
CPC ............. H04W 56/001; H04W 56/0025; H04J 11/0073; H04J 11/0076; H04B 7/2656
See application file for complete search history.

(56) References Cited

U.S. PATENT DOCUMENTS

| 10,785,759 B2 | 9/2020 | Lin et al. |
| 10,925,019 B2 | 2/2021 | Takeda et al. |

(Continued)

FOREIGN PATENT DOCUMENTS

| CN | 103795668 A | 5/2004 |
| CN | 102404840 A | 4/2012 |

(Continued)

OTHER PUBLICATIONS

62442694,Specification (Year: 2017).*

(Continued)

*Primary Examiner* — Yu-Wen Chang
(74) *Attorney, Agent, or Firm* — Harrity & Harrity, LLP

(57) ABSTRACT

Certain aspects of the present disclosure generally relate to wireless communication. In some aspects, a user equipment may identify that a band is associated with a first numerology and a second numerology for synchronization, and/or perform a synchronization scan to identify a synchronization signal block using stored data, wherein the stored data includes data regarding a plurality of frequency locations of the band, and wherein the synchronization scan is performed with regard to a first set of frequency locations, of the plurality of frequency locations, associated with the first numerology, and wherein the synchronization scan is performed with regard to a second set of frequency locations, of the plurality of frequency locations, associated with the second numerology, wherein the second set of frequency locations includes a proper subset of frequency locations of the plurality of frequency locations. Numerous other aspects are provided.

31 Claims, 7 Drawing Sheets

(56) References Cited

U.S. PATENT DOCUMENTS

| | | |
|---|---|---|
| 2013/0028150 A1 | 1/2013 | Ma et al. |
| 2015/0103733 A1 | 4/2015 | Ahmadi |
| 2015/0289216 A1 | 10/2015 | Xing et al. |
| 2017/0201968 A1* | 7/2017 | Nam ................... H04L 5/0048 |
| 2018/0020415 A1* | 1/2018 | Yilmaz ............ H04W 56/0015 |
| 2018/0092064 A1* | 3/2018 | Ryu .................... H04W 56/001 |
| 2018/0098298 A1* | 4/2018 | Jung ...................... H04L 27/266 |
| 2018/0249400 A1* | 8/2018 | Harada ................. H04W 48/18 |
| 2018/0262900 A1* | 9/2018 | Moon .................. H04J 11/0076 |
| 2018/0359070 A1* | 12/2018 | Astrom ............ H04W 56/0015 |
| 2019/0028315 A1* | 1/2019 | Park ................. H04W 56/0015 |
| 2019/0029003 A1* | 1/2019 | Takeda .................... H04W 4/06 |
| 2019/0103931 A1* | 4/2019 | Yi ......................... H04W 56/00 |
| 2019/0140880 A1* | 5/2019 | Li ............................. H04L 5/00 |
| 2019/0173721 A1* | 6/2019 | Gao .................... H04L 27/2676 |
| 2019/0208481 A1* | 7/2019 | Tang .................. H04W 56/001 |
| 2019/0230696 A1* | 7/2019 | Kim ...................... H04L 5/0053 |
| 2019/0357239 A1* | 11/2019 | Moon ................. H04W 72/042 |
| 2019/0380098 A1* | 12/2019 | Liu ....................... H04W 72/04 |
| 2020/0028726 A1 | 1/2020 | Karlsson et al. |
| 2020/0100131 A1* | 3/2020 | Yang ................. H04W 36/0011 |
| 2020/0136881 A1* | 4/2020 | Berggren ............. H04L 5/0048 |
| 2020/0275393 A1* | 8/2020 | Shin ........................ H04J 11/00 |

FOREIGN PATENT DOCUMENTS

| | | |
|---|---|---|
| CN | 104243118 A | 12/2014 |
| CN | 105722184 A | 6/2016 |
| CN | 107005960 A | 8/2017 |
| WO | WO-2016137532 A1 | 9/2016 |
| WO | 2017004774 A1 | 1/2017 |
| WO | WO-2017139540 A1 | 8/2017 |
| WO | 2018073683 A1 | 4/2018 |

OTHER PUBLICATIONS

International Search Report and Written Opinion—PCT/US2018/049833—ISA/EPO—dated Nov. 8, 2018.
Nokia., et al., "On Channel and Synchronization Signal Frequency Raster", 3GPP TSG-RAN WG1 Meeting #88bis, R1-1706138, Spokane, WA, USA Apr. 3-7, 2017, 4 Pages.
Samsung: "Numerology for NR synchronization signal", 3GPP TSG RAN WG1 Meeting #86bis, R1-1609112, Lisbon, Portugal, Oct. 10-14, 2016, pp. 1-4.
3GPP TS 38.104: "3rd Generation Partnership Project, Technical Specification Group Radio Access Network, NR, Station (BS) Radio Transmission and Reception (Release 15)", V15.2.0 (Jun. 2018), pp. 1-147.

* cited by examiner

TECHNIQUES AND APPARATUSES FOR SYNCHRONIZATION SIGNAL SCANNING BASED AT LEAST IN PART ON A SYNCHRONIZATION RASTER

CROSS-REFERENCE TO RELATED APPLICATIONS UNDER 35 U.S.C. § 119

This application claims priority to U.S. Provisional Patent Application No. 62/556,077, filed on Sep. 8, 2017, entitled "TECHNIQUES AND APPARATUSES FOR SYNCHRONIZATION SIGNAL SCANNING BASED AT LEAST IN PART ON A SYNCHRONIZATION RASTER," which is hereby expressly incorporated by reference herein.

FIELD OF THE DISCLOSURE

Aspects of the present disclosure generally relate to wireless communication, and more particularly to techniques and apparatuses for synchronization signal scanning based at least in part on a synchronization raster.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a user equipment may include identifying that a band is associated with a first numerology and a second numerology for synchronization; and performing a synchronization scan to detect a synchronization signal block using stored data, wherein the stored data includes data regarding a plurality of frequency locations of the band, wherein the synchronization scan is performed with regard to a first set of frequency locations, of the plurality of frequency locations, associated with the first numerology, and wherein the synchronization scan is performed with regard to a second set of frequency locations, of the plurality of frequency locations, associated with the second numerology, wherein the second set of frequency locations includes a proper subset of frequency locations of the plurality of frequency locations.

In some aspects, a user equipment for wireless communication may include memory and one or more processors operatively coupled to the memory. The memory and the one or more processors may be configured to identify that a band is associated with a first numerology and a second numerology for synchronization; and perform a synchronization scan to detect a synchronization signal block using stored data, wherein the stored data includes data regarding a plurality of frequency locations of the band, wherein the synchronization scan is performed with regard to a first set of frequency locations, of the plurality of frequency locations, associated with the first numerology, and wherein the synchronization scan is performed with regard to a second set of frequency locations, of the plurality of frequency locations, associated with the second numerology, wherein the second set of frequency locations includes a proper subset of frequency locations of the plurality of frequency locations.

In some aspects, a non-transitory computer-readable medium may store one or more instructions for wireless communication. The one or more instructions, when executed by one or more processors of a user equipment, may cause the one or more processors to identify that a band is associated with a first numerology and a second numerology for synchronization; and perform a synchronization scan to detect a synchronization signal block using stored data, wherein the stored data includes data regarding a plurality of frequency locations of the band, wherein the synchronization scan is performed with regard to a first set of frequency locations, of the plurality of frequency locations, associated with the first numerology, and wherein the synchronization scan is performed with regard to a second set of frequency locations, of the plurality of frequency locations, associated with the second numerology, wherein the second set of frequency locations includes a proper subset of frequency locations of the plurality of frequency locations.

In some aspects, an apparatus for wireless communication may include means for identifying that a band is associated with a first numerology and a second numerology for synchronization; and means for performing a synchronization scan to detect a synchronization signal block using stored data, wherein the stored data includes data regarding a plurality of frequency locations of the band, wherein the synchronization scan is performed with regard to a first set of frequency locations, of the plurality of frequency locations, associated with the first numerology, and wherein the synchronization scan is performed with regard to a second set of frequency locations, of the plurality of frequency locations, associated with the second numerology, wherein the second set of frequency locations includes a proper subset of frequency locations of the plurality of frequency locations.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
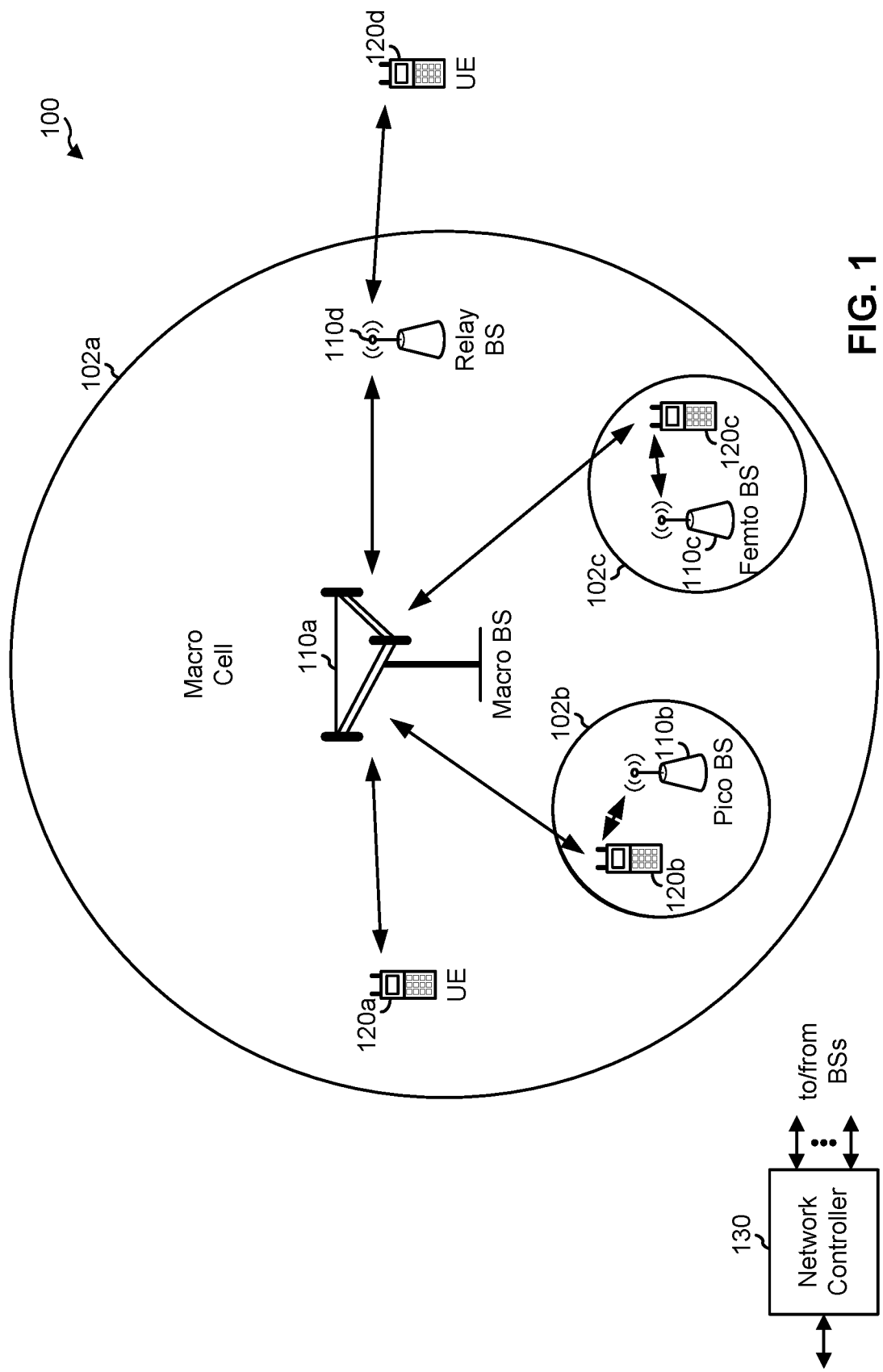
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
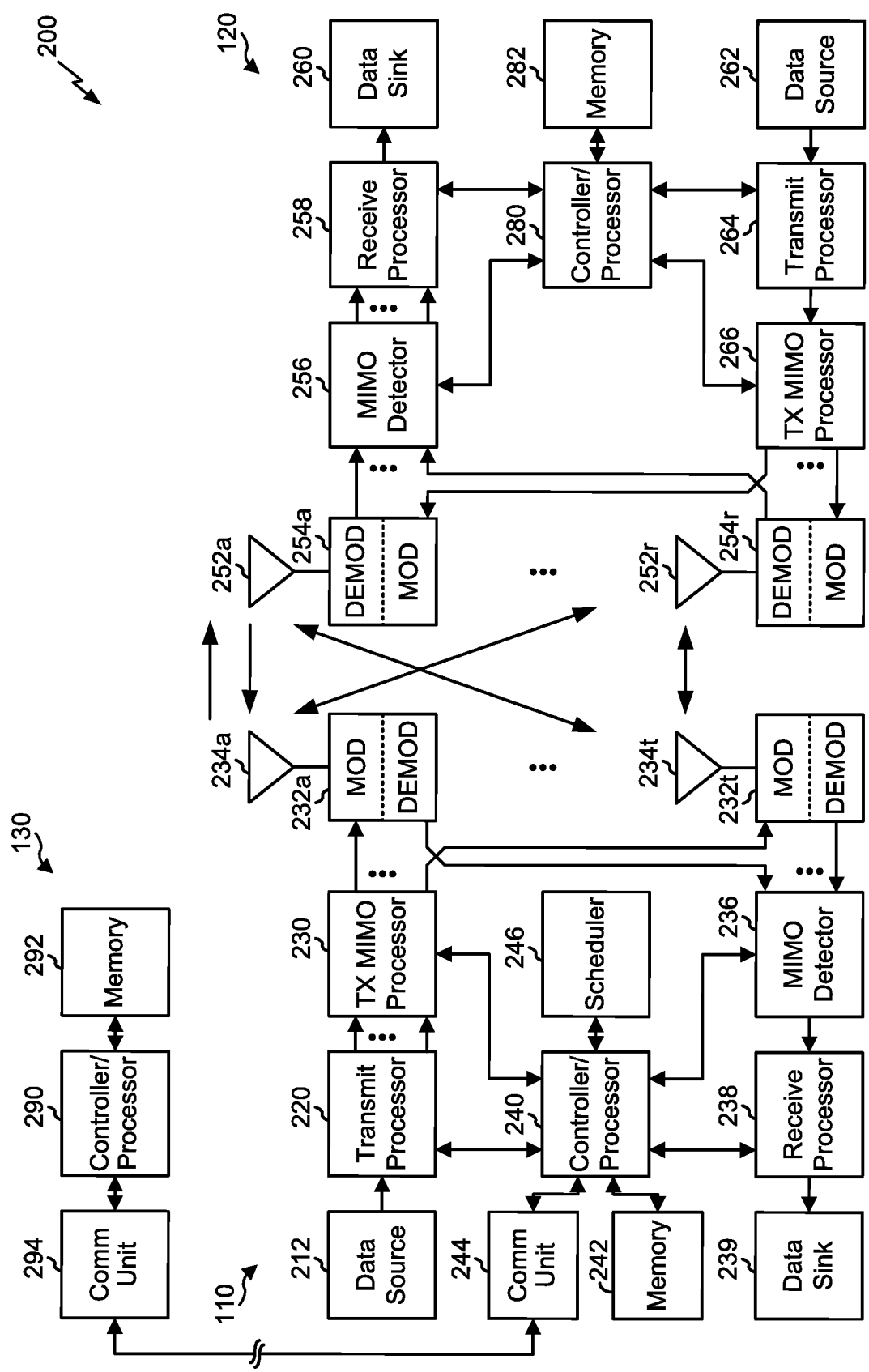
FIG. 2 is a block diagram conceptually illustrating an example of a base station in communication with a user equipment (UE) in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at BS 110 and UE 120, respectively, to perform a synchronization scan based at least in part on a synchronization signal location table identifying frequency locations for synchronization signal blocks of multiple numerologies. For example, controller/processor 280 and/or other processors and modules at UE 120, may perform or direct operations of UE 120 to perform a synchronization scan based at least in part on a synchronization signal location table identifying frequency locations for synchronization signal blocks of multiple numerologies. For example, controller/processor 280 and/or other controllers/processors and modules at UE 120 may perform or direct operations of, for example, process 600 of FIG. 6 and/or other processes as described herein. In some aspects, one or more of the components shown in FIG. 2 may be employed to perform example process 600 and/or other processes for the techniques described herein. Memories 242 and 282 may store data and program codes for BS 110 and UE 120, respectively. A scheduler 246 may schedule UEs for data transmission on the downlink and/or uplink.

In some aspects, UE 120 may include means for identifying that a band is associated with a first numerology and a second numerology for synchronization, means for performing a synchronization scan to detect a synchronization signal block using stored data, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
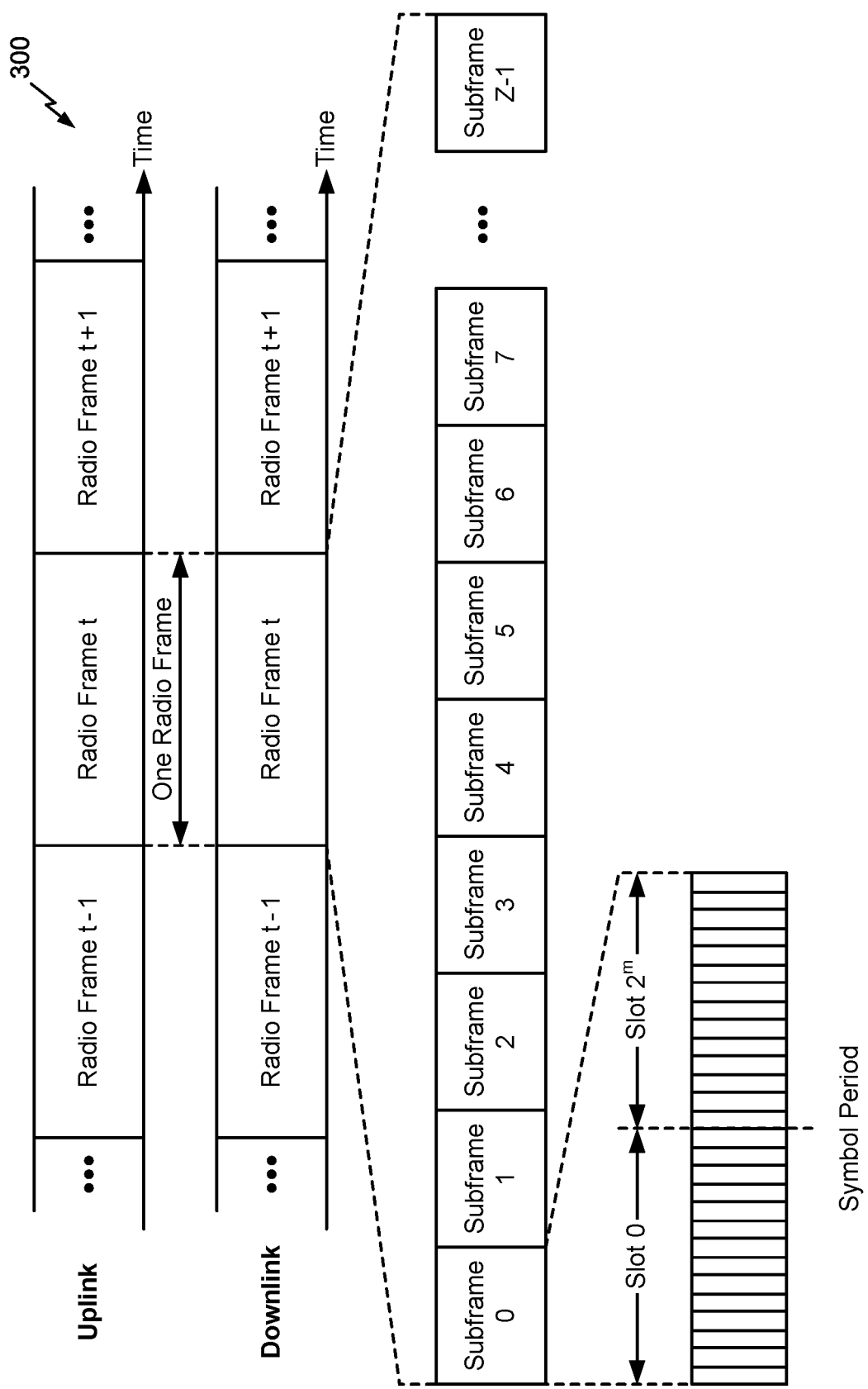
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
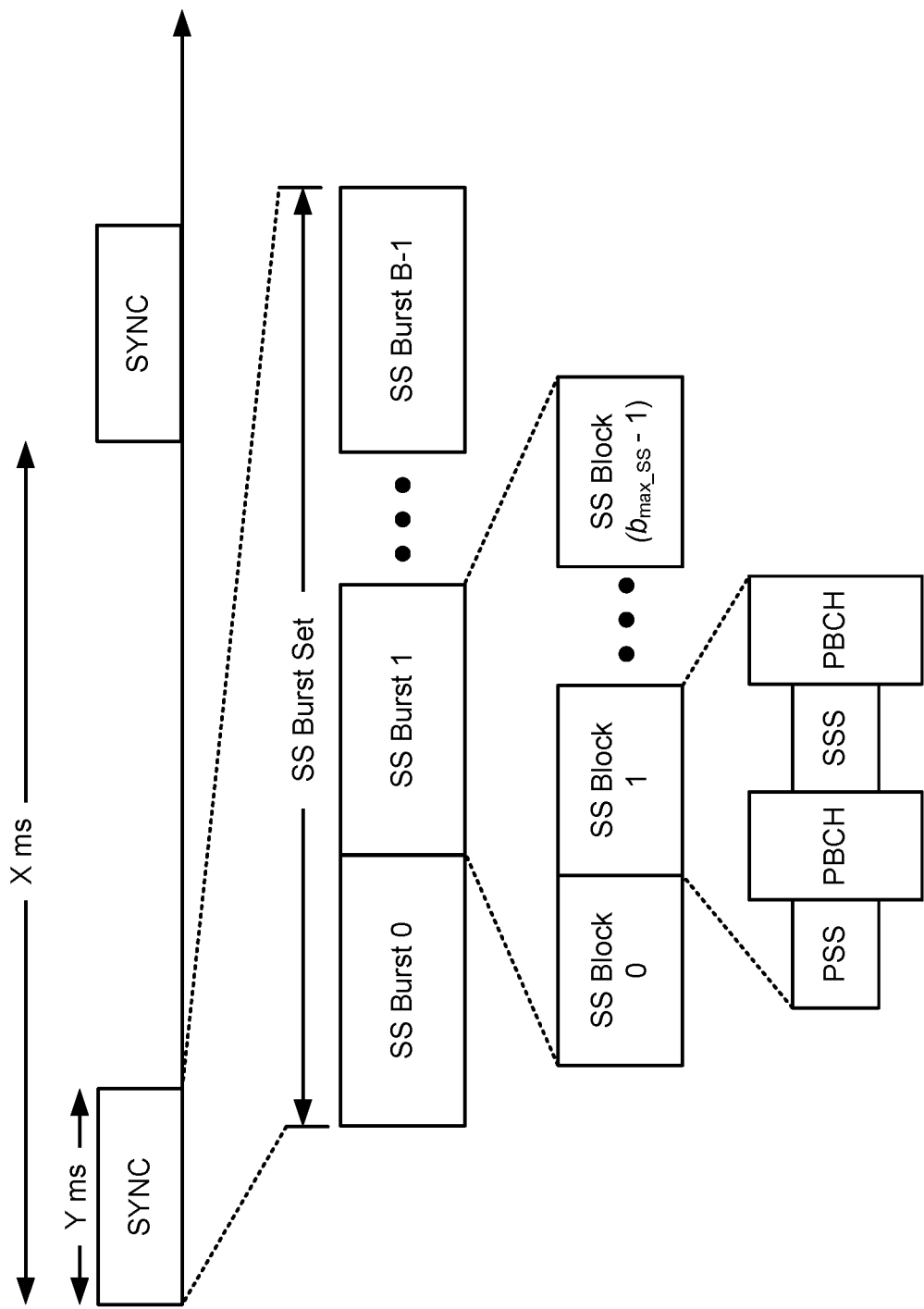
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where C may be configurable for each slot. The base station may transmit traffic data and/or other data on the PDSCH in the remaining symbol periods of each slot.

As indicated above, FIGS. 3A and 3B are provided as examples. Other examples are possible and may differ from what was described with regard to FIGS. 3A and 3B.

Figure 4:
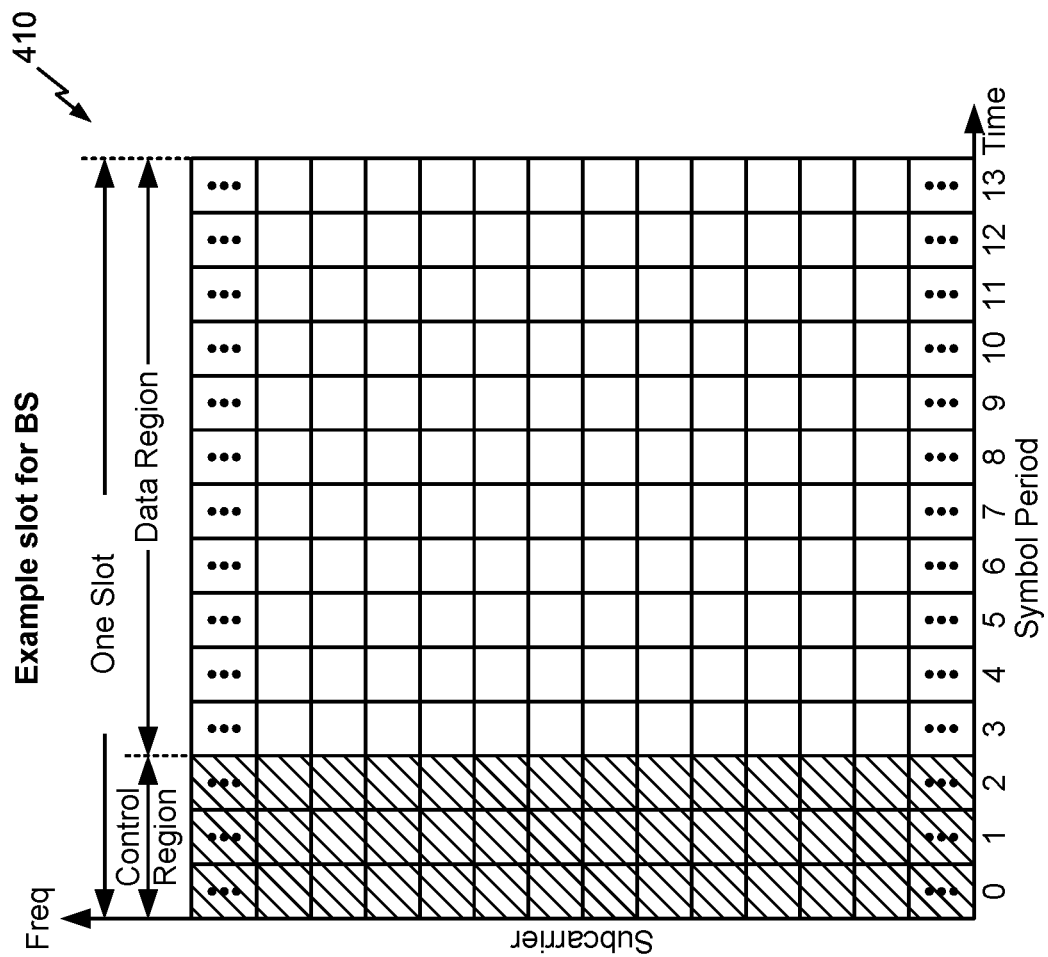
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Synchronization signals (e.g., PSS, SSS, tertiary synchronization signals (TSS), PBCH, a synchronization signal block, etc.) may be transmitted at particular frequency locations that are defined by a synchronization raster. For example, in a band associated with a frequency f, possible frequency locations for sending synchronization signals may include f+Nd, where d is the value of the synchronization raster and N is an integer. A synchronization raster may be used in 5G-NR because channel bandwidth and synchronization signal numerology are variable in 5G-NR, meaning that the 100 kHz channel raster used in LTE may not always be ideal. "Synchronization signal" may be used interchangeably with "synchronization signal block" and "SS/PBCH block" herein.

In 5G-NR, multiple numerologies may be supported for synchronization signals. For example, a 15 kHz and/or 30 kHz subcarrier spacing may be supported for sub-6 GHz bands, and a 120 kHz and/or 240 kHz subcarrier spacing may be supported above 6 GHz. In some bands, multiple numerologies of synchronization signal may be employed. For example, one operator may use 15 kHz synchronization signals, whereas another operator may use 30 kHz synchronization signals.

When performing initial access, a UE may scan frequency locations until the UE identifies a synchronization signal. For example, the UE may search possible frequency locations, assuming each possible numerology, until a synchronization signal is identified. This may lead to high cell search complexity and long initial access latency, because the UE must check multiple numerologies at each frequency location until a synchronization signal is identified.

Techniques and apparatuses described herein may reduce the number of hypotheses or searches associated with identifying synchronization signals for a band associated with multiple numerologies for synchronization signals. For example, some techniques and apparatuses described herein may use a table that identifies a single numerology for each potential frequency location to perform the synchronization scan of the initial access procedure. Some techniques and apparatuses described herein may use a table that identifies frequency locations for synchronization signals of the numerologies of a band, and that identifies a subset of possible frequency locations for one of the numerologies of the band. In this way, at a given frequency location, the UE may need to check only a single numerology of a synchronization signal or a reduced number of numerologies. Thus, search complexity of the initial access procedure is reduced. Furthermore, by using the table, the number of candidate frequency locations for a given numerology of synchronization signal can be reduced, which reduces latency associated with the cell search and initial access.

Figure 5:
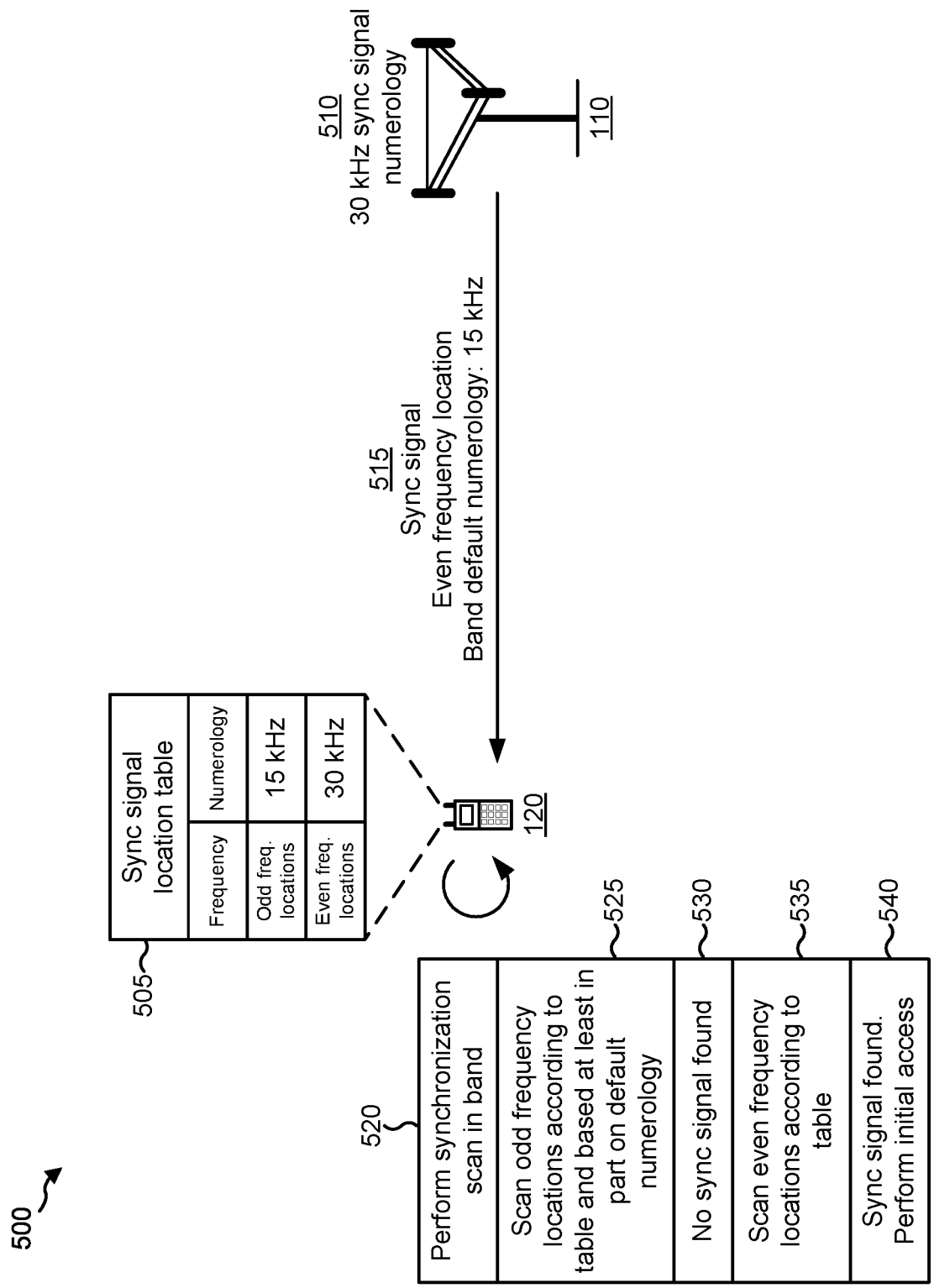
FIG. 5 is a diagram illustrating an example of performing a synchronization scan based at least in part on a synchronization signal location table identifying a single numerology for each frequency location, in accordance with various aspects of the present disclosure.

FIG. 5 is a diagram illustrating an example 500 of performing a synchronization scan based at least in part on a synchronization signal location table identifying frequency locations for each numerology of a band, in accordance with various aspects of the present disclosure. FIG. 5 describes operations performed with regard to a band, which may include a 4G-LTE band, a 5G-NR band, a band of a different radio access technology, and/or a combination of the above. For the purpose of FIG. 5, assume that the band is associated with two different numerologies of 15 kHz and 30 kHz. However, in some aspects, the band may be associated with any combination of different numerologies (e.g., 30 kHz and 60 kHz, 120 kHz and 240 kHz, and/or the like).

As shown in FIG. 5, and by reference number 505, a UE 120 may store a synchronization signal location table (shown as sync signal location table). The synchronization signal location table may include data identifying a plurality of sets of frequency locations and respective numerologies associated with the sets of frequency locations. Here, the synchronization signal location table indicates that a set of odd frequency locations are associated with a numerology of 15 kHz (e.g., the default numerology of the band). Furthermore, the synchronization signal location table indicates that a set of even frequency locations are associated with a numerology of 30 kHz. For example, assume that the band is associated with a frequency of f. In that case, odd frequency locations may include f+d, f+3d, f+5d, and so on, wherein d is the synchronization raster of the band. Similarly, even frequency locations may include f, f+2d, f+4d, and so on. In some aspects, the synchronization signal location table may identify a synchronization signal pattern (e.g., a synchronization signal block pattern) for scanning for a synchronization signal of a particular numerology. For example, different numerologies may be associated with different synchronization signal patterns. The UE 120 may scan for a synchronization signal block of a particular numerology in accordance with the corresponding pattern. In some aspects, the synchronization raster may be constructed according to the default numerology of the band, which is described in more detail below.

By assigning a single numerology to each frequency location, cell search complexity and initial access latency are reduced. For example, the UE 120 may search only a single numerology at each frequency location, rather than searching every numerology associated with the band at each frequency location, as described in more detail below.

In some aspects, the synchronization signal location table may identify multiple numerologies for a given frequency location. For example, a synchronization signal of a first numerology may use all frequency locations of the synchronization signal location table, and a synchronization signal of a second numerology may use a subset of frequency locations of the synchronization signal location table (e.g., every other frequency location, every third frequency location, etc.). Thus, the number of hypotheses for synchronization signal scanning is reduced in comparison to using all frequency locations for both numerologies.

In some aspects, the synchronization signal location table may relate to more than two different numerologies. Additionally, or alternatively, the synchronization signal location table may not evenly divide the frequency locations between two numerologies. For example, one numerology (e.g., a default numerology, a more commonly utilized numerology, a higher-priority numerology, etc.) may be associated with a larger number of frequency locations than another numerology (e.g., a non-default numerology, a less commonly utilized numerology, a lower-priority numerology, etc.). This may reduce cell search complexity and initial access latency for the one numerology while providing frequency locations for synchronization signals of the other numerology.

In some aspects, the synchronization signal location table may be based at least in part on a synchronization frequency grid. A synchronization raster of the synchronization frequency grid may be based at least in part on a default synchronization numerology for the band, and locations of the grid may be assigned, by default, to the default synchronization numerology. For example, the synchronization raster may be equal to the default synchronization numerology. Additionally, or alternatively, at least one synchronization frequency location on the grid may be used for another sync numerology. For example, the at least one synchronization frequency location may not be used for the default synchronization numerology, or both synchronization numerologies may be used at the at least one synchronization frequency location.

As shown by reference number 510, a BS 110 may be associated with the 30 kHz numerology for synchronization signals provided by the BS 110. For example, a carrier or cell provided by the BS 110 may be associated with the 30 kHz numerology. Therefore, and as shown by reference number 515, the base station may provide a synchronization signal on an even frequency location. This may be because even frequency locations of the band are designated for the 30 kHz synchronization signal numerology according to the synchronization signal location table in this example. In some aspects, the synchronization signal location table may be known to the UE 120 and the BS 110. For example, the synchronization signal location table may be specified in a standard or specification.

As shown by reference number 520, the UE 120 may perform a synchronization scan in the band. For example, the UE 120 may perform the synchronization scan as part of an initial access procedure. When performing the synchronization scan, the UE 120 may not know specifically the frequency location in which the synchronization signal is transmitted. Therefore, the UE 120 may scan frequency locations, according to the synchronization signal location table, based at least in part on the numerologies associated with the band, as described in more detail below.

As shown by reference number 525, the UE 120 may first scan odd frequency locations. For example, the UE 120 may identify the odd frequency locations using the table and based at least in part on the 15 kHz numerology being the default numerology of the band. In some aspects, the UE 120 may perform the scan using a pattern identified by the table for the 15 kHz numerology. By first scanning odd frequency locations, the UE 120 first completes a scan of frequency locations associated with a most likely numerology (e.g., the default numerology) before moving on to other numerologies. Of course, other orders for scanning of frequency locations are possible. As shown by reference number 530, the UE 120 determines that no synchronization signal is found in the odd frequency locations.

As shown by reference number 535, the UE 120 may scan even frequency locations (i.e., the locations associated with the 30 kHz numerology) according to the table. For example, after exhausting the odd frequency locations, the UE 120 may begin scanning the even frequency locations. In some aspects, the UE 120 may scan the even frequency locations using a pattern identified by the table for the 30 kHz numerology. In some aspects, the UE 120 may not scan the frequency locations associated with the default numerology first. For example, the UE 120 may perform a progressive scan along the band (e.g., f, f+d, f+2d, f+3d, and so on). Even when performing such a progressive scan, initial access latency may be improved over scanning every numerology at every frequency location, since a reduced number of numerologies is scanned.

As shown by reference number 540, the UE 120 may identify a synchronization signal while scanning the even frequency locations. Accordingly, the UE 120 may perform initial access using the identified synchronization signal. In this way, UE search complexity is reduced. Furthermore, a number of frequency location candidates for a given numerology can be reduced, thereby providing a shorter cell search and initial access latency.

In some aspects, a UE 120 may perform a synchronization scan in non-standalone (NSA) mode. In NSA mode, the UE 120 may perform the synchronization scan based at least in part on signaling from a B S 110. For example, the signaling may identify a numerology of a synchronization signal to be transmitted in an NSA cell of the BS 110 and to be detected by the UE 120. In such a case, the UE 120 may perform the synchronization scan based at least in part on the identified numerology. For example, the UE 120 may determine the synchronization raster according to the identified numerology (e.g., the synchronization raster may be equal to the identified numerology), and may search the band based at least in part on the synchronization raster. In this way, the BS 110 may overwrite the synchronization signal location table, which may provide increased flexibility for NSA cells with different synchronization numerologies.

As indicated above, FIG. 5 is provided as an example. Other examples are possible and may differ from what was described with respect to FIG. 5.

Figure 6:
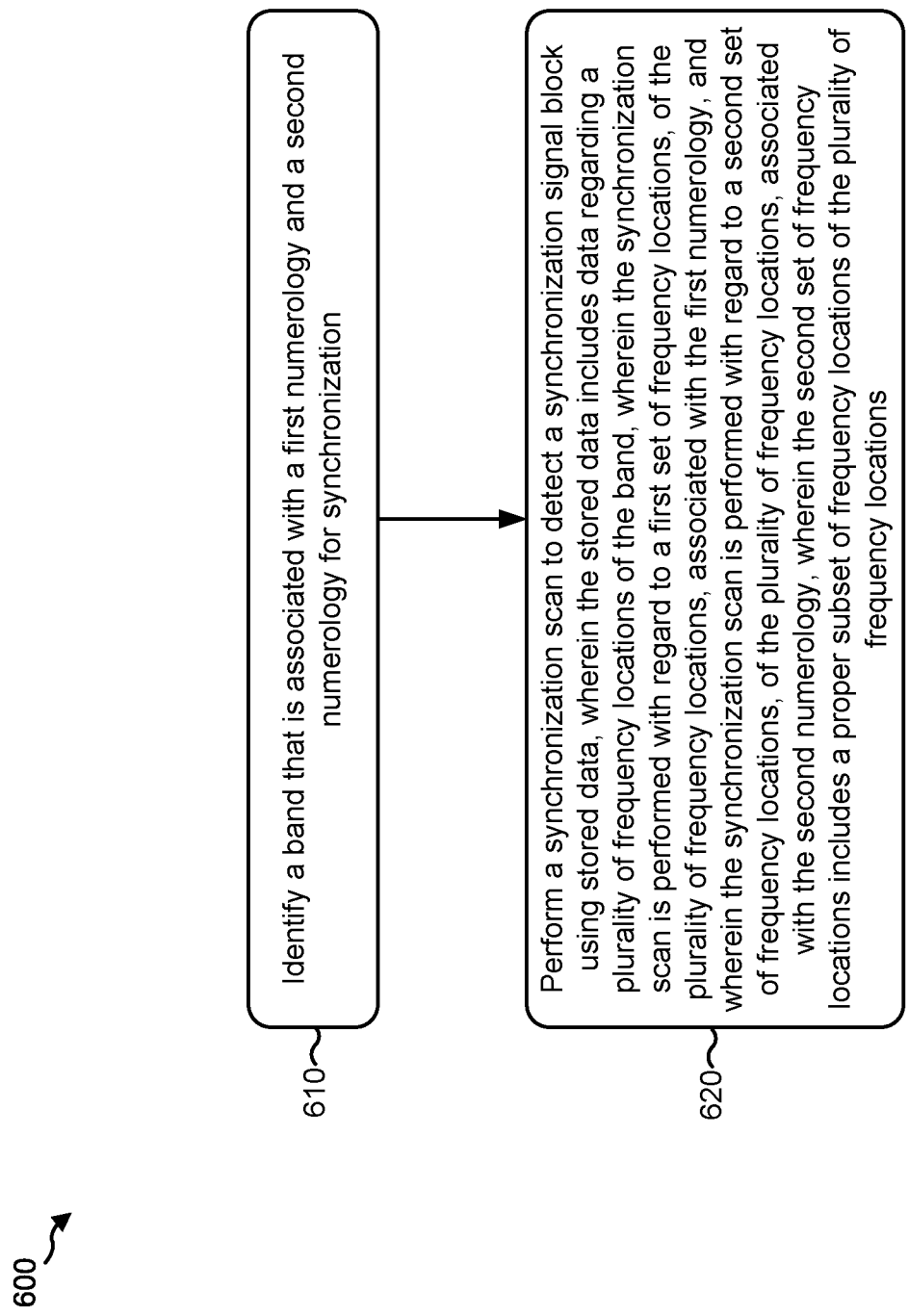
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a user equipment (e.g., UE 120) performs a synchronization scan based at least in part on a synchronization signal location table identifying a single numerology for each frequency location.

As shown in FIG. 6, in some aspects, process 600 may include identifying a band that is associated with a first numerology and a second numerology for synchronization (block 610). For example, the user equipment may identify a band that is associated with a first numerology and a second numerology for synchronization (e.g., for transmission of a synchronization signal block). In some aspects, the band may be associated with more than two numerologies. The user equipment may identify the band to perform a synchronization scan in the band based at least in part on stored data, as described in more detail below.

As shown in FIG. 6, in some aspects, process 600 may include performing a synchronization scan to detect a synchronization signal block using stored data, wherein the stored data includes data regarding a plurality of frequency locations of the band, wherein the synchronization scan is performed with regard to a first set of frequency locations, of the plurality of frequency locations, associated with the first numerology, and wherein the synchronization scan is performed with regard to a second set of frequency locations, of the plurality of frequency locations, associated with the second numerology, wherein the second set of frequency locations includes a proper subset of frequency locations of the plurality of frequency locations (block 620). For example, the user equipment may perform a synchronization scan using stored data. The stored data may include a synchronization signal location table, as described in more detail above. The stored data may include data regarding a plurality of frequency locations of the band, which may be divided into two or more sets of frequency locations. For example, each set of frequency locations may be associated with a single numerology. The user equipment may perform a synchronization scan with regard to a first set of frequency locations associated with a first numerology and/or with regard to a second set of frequency locations associated with a second numerology. For example, the user equipment may first perform the synchronization scan with regard to the first numerology, and may second perform the synchronization scan with regard to the second numerology.

Process 600 may include additional aspects, such as any single aspect or any combination of aspects described below and/or in connection with one or more other processes described elsewhere herein.

In some aspects, the first set of frequency locations does not overlap with the second set of frequency locations. In some aspects, frequency locations of the first set of frequency locations alternate with frequency locations of the second set of frequency locations. In some aspects, the band is associated with a frequency, the first set of frequency locations is associated with one of odd-number frequency offsets from the frequency or even-number frequency offsets from the frequency, and the second set of frequency locations is associated with an opposite one of the odd-number frequency offsets or the even-number frequency offsets.

In some aspects, the first numerology and the second numerology are of a plurality of numerologies associated with the band, and the plurality of numerologies are associated with respective non-overlapping sets of frequency locations. In some aspects, the synchronization signal block contains at least one of a primary synchronization signal (PSS), a secondary synchronization signal (SSS), a tertiary synchronization signal (TSS), or a physical broadcast channel (PBCH).

In some aspects, the stored data identifies the plurality of frequency locations and indicates respective numerologies associated with the plurality of frequency locations. In some aspects, the stored data identifies one numerology per frequency location. In some aspects, the first set of frequency locations has a different quantity of frequency locations than the second set of frequency locations. In some aspects, frequency locations, of the plurality of frequency locations, are determined according to a synchronization raster that identifies a spacing of the plurality of frequency locations. In some aspects, the user equipment is in a non-standalone mode, and frequency locations, of the plurality of frequency locations, are determined according to the synchronization raster in connection with an indication, received by the user equipment, indicating that the synchronization raster is to be used to determine the plurality of frequency locations in the non-standalone mode. In some aspects, the stored data is shared between the user equipment and a network to which the user equipment is connected.

In some aspects, the first set of frequency locations is associated with a first spacing and the second set of frequency locations is associated with a second spacing different than the first spacing. In some aspects, the first set of frequency locations includes all frequency locations of the plurality of frequency locations. In some aspects, the synchronization scan is performed with regard to the first set of frequency locations using a first pattern, and wherein the synchronization scan is performed with regard to the second set of frequency locations using a second pattern. In some aspects, the first pattern corresponds to the first numerology and the second pattern corresponds to the second numerology. In some aspects, the first numerology is associated with a first subcarrier spacing and the second numerology is associated with a second subcarrier spacing.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
   identifying that a band is associated with a first numerology and a second numerology for synchronization; and
   performing a synchronization scan to detect a synchronization signal block using stored data, wherein the stored data includes data regarding a plurality of frequency locations of the band,
      wherein frequency locations, of the plurality of frequency locations, are indicated by a synchronization raster of the band that identifies a spacing of the plurality of frequency locations for sending synchronization signal blocks,
      wherein the synchronization scan is performed with regard to a first set of frequency locations, of the plurality of frequency locations, associated with the first numerology,
      wherein the synchronization scan is performed with regard to the first set of frequency locations using a first pattern identified in the stored data,
      wherein the synchronization scan is performed with regard to a second set of frequency locations, of the plurality of frequency locations, associated with the second numerology, and
      wherein the synchronization scan is performed with regard to the second set of frequency locations using a second pattern identified in the stored data.

2. The method of claim 1, wherein the first numerology and the second numerology are of a plurality of numerologies associated with the band,
   wherein the plurality of numerologies are associated with respective non-overlapping sets of frequency locations.

3. The method of claim 1, wherein the synchronization signal block contains at least one of a primary synchronization signal (PSS), a secondary synchronization signal (SSS), a tertiary synchronization signal (TSS), or a physical broadcast channel (PBCH).

4. The method of claim 1, wherein respective numerologies are associated with the plurality of frequency locations.

5. The method of claim 1, wherein the first set of frequency locations has a different quantity of frequency locations than the second set of frequency locations.

6. The method of claim 1, wherein the user equipment is in a non-standalone mode; and
   wherein frequency locations, of the plurality of frequency locations, are determined according to the synchronization raster in connection with an indication, received by the user equipment, indicating that the synchronization raster is to be used to determine the plurality of frequency locations in the non-standalone mode.

7. The method of claim 1, wherein the first set of frequency locations is associated with a first spacing and the second set of frequency locations is associated with a second spacing different than the first spacing.

8. The method of claim 1, wherein the first set of frequency locations includes all frequency locations of the plurality of frequency locations.

9. The method of claim 1, wherein the first pattern corresponds to the first numerology and the second pattern corresponds to the second numerology.

10. The method of claim 1, wherein the first numerology is associated with a first subcarrier spacing and the second numerology is associated with a second subcarrier spacing.

11. The method of claim 1, wherein data regarding the plurality of frequency locations of the band is shared between the user equipment and a network to which the user equipment is connected.

12. The method of claim 1, wherein the second set of frequency locations includes every other frequency location of the first set of frequency locations.

13. A user equipment (UE) for wireless communication, comprising:
   a memory; and
   one or more processors coupled to the memory, the one or more processors configured to:
      identify that a band is associated with a first numerology and a second numerology for synchronization; and
      perform a synchronization scan to detect a synchronization signal block using stored data, wherein the stored data includes data regarding a plurality of frequency locations of the band,
         wherein frequency locations, of the plurality of frequency locations, are indicated by a synchronization raster of the band that identifies a spacing of the plurality of frequency locations for sending synchronization signal blocks,
         wherein the synchronization scan is performed with regard to a first set of frequency locations, of the plurality of frequency locations, associated with the first numerology,
         wherein the synchronization scan is performed with regard to the first set of frequency locations using a first pattern identified in the stored data,
         wherein the synchronization scan is performed with regard to a second set of frequency locations, of the plurality of frequency locations, associated with the second numerology, and
         wherein the synchronization scan is performed with regard to the second set of frequency locations using a second pattern identified in the stored data.

14. The UE of claim 13, wherein the synchronization signal block contains at least one of a primary synchronization signal (PSS), a secondary synchronization signal (SSS), a tertiary synchronization signal (TSS), or a physical broadcast channel (PBCH).

15. The UE of claim 13, wherein respective numerologies are associated with the plurality of frequency locations.

16. The UE of claim 13, wherein the first set of frequency locations has a different quantity of frequency locations than the second set of frequency locations.

17. The UE of claim 13, wherein the first set of frequency locations is associated with a first spacing and the second set of frequency locations is associated with a second spacing different than the first spacing.

18. The UE of claim 13, wherein the first set of frequency locations includes all frequency locations of the plurality of frequency locations.

19. The UE of claim 13, wherein the second set of frequency locations includes every other frequency location of the first set of frequency locations.

20. The UE of claim 13, wherein the stored data is a table.

21. The UE of claim 13,
wherein the first pattern is a first synchronization signal block pattern, and
wherein the second pattern is a second synchronization signal block pattern.

22. The UE of claim 13,
wherein the first numerology is 120 kHz, and
wherein the second numerology is 240 kHz.

23. The UE of claim 13, wherein the first pattern and the second pattern are based on the spacing.

24. A non-transitory computer-readable medium storing one or more instructions for wireless communication, the one or more instructions comprising:
one or more instructions that, when executed by one or more processors of a user equipment (UE), cause the one or more processors to:
identify that a band is associated with a first numerology and a second numerology for synchronization; and
perform a synchronization scan to detect a synchronization signal block using stored data, wherein the stored data includes data regarding a plurality of frequency locations of the band,
wherein frequency locations, of the plurality of frequency locations, are indicated by a synchronization raster of the band that identifies a spacing of the plurality of frequency locations for sending synchronization signal blocks,
wherein the synchronization scan is performed with regard to a first set of frequency locations, of the plurality of frequency locations, associated with the first numerology,
wherein the synchronization scan is performed with regard to the first set of frequency locations using a first pattern identified in the stored data,
wherein the synchronization scan is performed with regard to a second set of frequency locations, of the plurality of frequency locations, associated with the second numerology, and
wherein the synchronization scan is performed with regard to the second set of frequency locations using a second pattern identified in the stored data.

25. The non-transitory computer-readable medium of claim 24, wherein the first set of frequency locations has a different quantity of frequency locations than the second set of frequency locations.

26. The non-transitory computer-readable medium of claim 24, wherein the first set of frequency locations is associated with a first spacing and the second set of frequency locations is associated with a second spacing different than the first spacing.

27. The non-transitory computer-readable medium of claim 24, wherein the second set of frequency locations includes every other frequency location of the first set of frequency locations.

28. An apparatus for wireless communication, comprising:
means for identifying that a band is associated with a first numerology and a second numerology for synchronization; and
means for performing a synchronization scan to detect a synchronization signal block using stored data, wherein the stored data includes data regarding a plurality of frequency locations of the band,
wherein frequency locations, of the plurality of frequency locations, are indicated by a synchronization raster of the band that identifies a spacing of the plurality of frequency locations for sending synchronization signal blocks,
wherein the synchronization scan is performed with regard to a first set of frequency locations, of the plurality of frequency locations, associated with the first numerology,
wherein the synchronization scan is performed with regard to the first set of frequency locations using a first pattern identified in the stored data,
wherein the synchronization scan is performed with regard to a second set of frequency locations, of the plurality of frequency locations, associated with the second numerology, and
wherein the synchronization scan is performed with regard to the second set of frequency locations using a second pattern identified in the stored data.

29. The apparatus of claim 28, wherein the first set of frequency locations is associated with a first spacing and the second set of frequency locations is associated with a second spacing different than the first spacing.

30. The apparatus of claim 28, wherein the second set of frequency locations includes every other frequency location of the first set of frequency locations.

31. The apparatus of claim 28, wherein the first set of frequency locations is associated with a first spacing and the second set of frequency locations is associated with a second spacing different than the first spacing.

* * * * *